(12) United States Patent
Lin et al.

(10) Patent No.: US 11,301,759 B2
(45) Date of Patent: Apr. 12, 2022

(54) DETECTIVE METHOD AND SYSTEM FOR ACTIVITY-OR-BEHAVIOR MODEL CONSTRUCTION AND AUTOMATIC DETECTION OF THE ABNORMAL ACTIVITIES OR BEHAVIORS OF A SUBJECT SYSTEM WITHOUT REQUIRING PRIOR DOMAIN KNOWLEDGE

(71) Applicant: NATIONAL TAIWAN UNIVERSITY, Taipei (TW)

(72) Inventors: Phone Lin, Taipei (TW); Tao Zhang, Taipei (TW); En-Hau Yeh, Taipei (TW); Xin-Xue Lin, Taipei (TW); Chia-Peng Lee, Taipei (TW); Brian Hu Zhang, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 1140 days.

(21) Appl. No.: 15/857,247

(22) Filed: Dec. 28, 2017

(65) Prior Publication Data

US 2019/0205771 A1 Jul. 4, 2019

(51) Int. Cl.
*G06N 5/02* (2006.01)
*G06N 20/00* (2019.01)
(Continued)

(52) U.S. Cl.
CPC .......... *G06N 5/022* (2013.01); *G06F 40/216* (2020.01); *G06F 40/30* (2020.01); *G06N 20/00* (2019.01)

(58) Field of Classification Search
CPC ...... G06N 5/022; G06N 20/00; G06F 40/216; G06F 40/30
See application file for complete search history.

(56) References Cited

U.S. PATENT DOCUMENTS

| 7,383,238 B1 * | 6/2008 | Iverson | G06N 20/00 706/25 |
| 8,972,815 B1 * | 3/2015 | Hwee | H04L 1/0064 714/752 |

(Continued)

OTHER PUBLICATIONS

Yan, W. ., & Yu, L. . (2015). On Accurate and Reliable Anomaly Detection for Gas Turbine Combustors: A Deep Learning Approach. Annual Conference of the PHM Society, 7(1). https://doi.org/10.36001/phmconf.2015.v7i1.2655 (Year: 2015).*

(Continued)

*Primary Examiner* — Eric Nilsson
(74) *Attorney, Agent, or Firm* — Chen Yoshimura LLP

(57) ABSTRACT

A detective method, applied in a detective system comprising an activity-or-behavior model constructor, for activity-or-behavior model construction and automatic detection of activities of a subject system, comprises steps of using an unsupervised machine learning technique, a Natural Language Processing technique (NLP) and a supervised machine learning technique. As such, an activity-or-behavior model is built for predicting the future behaviors of the subject system and automatically detecting abnormal activities or behaviors of the subject system. The activity-or-behavior model is capable to handle multidimensional sensor data input from a plurality of sensor data streams and incorporate the sensor data values and a selected temporal information about at least one sensor data stream and between different sensor data streams.

12 Claims, 3 Drawing Sheets

(51) Int. Cl.
  *G06F 40/30* (2020.01)
  *G06F 40/216* (2020.01)

(56) References Cited

U.S. PATENT DOCUMENTS

2016/0358268 A1* 12/2016 Verma ............... G06F 16/24564
2017/0032281 A1* 2/2017 Hsu ..................... B23K 31/125
2017/0206470 A1* 7/2017 Marculescu ............ H04L 51/32

OTHER PUBLICATIONS

He, S. (Oct. 23, 2016). Experience report: System log analysis for anomaly detection. IEEE Xplore. https://ieeexplore.ieee.org/document/7774521 (Year: 2016).*

Du, M. (Oct. 30, 2017). DeepLog: Anomaly detection and diagnosis from system logs through deep learning :: Vivek Srikumar. Vivek Srikumar. https://svivek.com/research/du2017deeplog.html (Year: 2017).*

Baier, T. (Aug. 2015). Publish.UP matching events and activities, publish.UP Home. https://publishup.uni-potsdam.de/opus4-ubp/frontdoor/index/index/docId/8454 (Year: 2015).*

Tanev, H. (Jun. 24, 2008). Real-time news event extraction for global crisis monitoring. ACM Digital Library. https://dl.acm.org/doi/10.1007/978-3-540-69858-6_21 (Year: 2008).*

Narimatsu, H. (Jul. 12, 2015). Duration and interval hidden Markov model for sequential data analysis. IEEE Xplore. https://ieeexplore.ieee.org/document/7280808 (Year: 2015).*

Tapia, E. (Sep. 2003). Activity recognition in the home setting using simple and ubiquitous sensors. Semantic Scholar | AI-Powered Research Tool. https://www.semanticscholar.org/paper/Activity-recognition-in-the-home-setting-using-and-Tapia-Emmanuel./18d1f54f339d556f5a1f8984fe9eb22ab52be9cf (Year: 2003).*

Zhang, L. (Dec. 2016). Big data analytics for fault detection and its application in maintenance. Semantic Scholar | AI-Powered Research Tool. https://www.semanticscholar.org/paper/Big-Data-Analytics-for-Fault-Detection-and-its-in-Zhang/9c61baa0db41eb74e92b64735571e74c5205c3c7 (Year: 2016).*

Christophe Bertero, Matthieu Roy, Carla Sauvanaud, Gilles Trédan. Experience Report: Log Mining using Natural Language Processing and Application to Anomaly Detection. 28th International Symposium on Software Reliability Engineering (ISSRE 2017), Oct. 2017, Toulouse, France. 10p., 2017. (Year: 2017).*

Li, W. (Nov. 2013). Automatic log analysis using machine learning: Awesome automatic log analysis version 2.0. DIVA. https://uu.diva-portal.org/smash/record.jsf?pid=diva2%3A667650&dswid=4469 (Year: 2013).*

LSTM-based encoder-decoder for multi-sensor anomaly detection. (Jul. 11, 2016). arXiv.org. https://arxiv.org/abs/1607.00148 (Year: 2016).*

Kicanaoglu, B. (Aug. 12, 2015). Unsupervised anomaly detection in unstructured log-data for root-cause-Analysis. Etusivu. https://trepo.tuni.fi/handle/123456789/23217 (Year: 2015).*

\* cited by examiner

DETECTIVE METHOD AND SYSTEM FOR ACTIVITY-OR-BEHAVIOR MODEL CONSTRUCTION AND AUTOMATIC DETECTION OF THE ABNORMAL ACTIVITIES OR BEHAVIORS OF A SUBJECT SYSTEM WITHOUT REQUIRING PRIOR DOMAIN KNOWLEDGE

FIELD OF THE INVENTION

The present invention generally relates to a detective method and detective system for activity-or-behavior model construction and automatic detection of the abnormal activities or behaviors of a subject system. Specifically, the present invention generally relates to a detective method and detective system for activity-or-behavior model construction and automatic detection of the abnormal activities or behaviors of a subject system without requiring prior domain knowledge.

BACKGROUND OF THE INVENTION

Please refer to FIG. 3, which illustrates the problem domains addressed by the three categories of detection methods. Based on whether a solution can detect data anomaly, abnormal activities or behaviors; whether a solution can handle only a single type of sensors or multiple types of sensors; and whether a solution requires domain knowledge or not, the activity detection methods can be divided into the following three categories:
C1: Solutions for data anomaly detection for IoT systems using multiple types of sensors with or without domain knowledge. Examples of these solutions include most time series analysis methods;
C2: Solutions for activity anomaly detection for IoT systems using multiple types of sensors with domain knowledge;
C3: Solutions for activity anomaly detection for IoT systems using multiple types of sensors without domain knowledge;

C1 is the most general category of solutions. However, most conventional detecting methods focus on detecting anomaly in the sensor data received from a subject system rather than the behaviors performed by the subject system. Here, the conventional detecting methods for detecting data anomaly are grouped into the following three main categories based on the main techniques they rely on: statistical modeling, unsupervised machine learning, and supervised machine learning.

Statistical modeling, such as time series analysis, can be used to create statistical models of the data, which can then be used to detect data anomaly, represented by abnormal future data samples, by verifying whether they follow the models. Such techniques are often used to detect statistical aberrations such as data sample outliers and significant changes in the means of the data samples. These statistical analysis tools require domain knowledge to what statistical deviations from the models indicate abnormal data. Today, statistical modeling typically can handle unidimensional or small dimensional data. However, IoT systems are usually characterized by many parameters, and such nature makes high-dimensional analysis essential because isolated analysis with respect to each parameter often cannot adequately reveal a system's behaviors.

Unsupervised machine learning can be used to cluster data samples. The clustering can then be used to detect whether future data samples for representing anomaly are abnormal by verifying whether they fall into at least one of the clusters. Such unsupervised machine learning techniques do not require domain knowledge and can handle multidimensional data. However, they cannot easily take into account the temporal relations between the data samples, or a sequence of data samples that represent an abnormal behavior while each individual data sample may actually appear to be normal, and hence have limited detection capabilities.

Supervised machine learning can be used to build anomaly detection models. However, conventional methods that use supervised machine learning all require domain knowledge to derive input label values required to indicate whether each input training data sample is normal or abnormal (relating to anomaly). This means when applied to detect abnormal activities, human experts will be required to identify which training data samples represent an activity and which activities are normal or abnormal.

Recently, conventional methods for detecting anomaly in activities of an IoT system, as opposed to just abnormal sensor data from the subject system, began to emerge. These conventional methods all require domain knowledge about the subject system and typically rely on manual processes to define or predefine the normal and abnormal activities performed by the system or identify such activities from the training data sets; and associate each training data sample with its corresponding normal or abnormal activities.

The detection methods that rely on prior domain knowledge can only apply to the types of systems or applications for which they have prior domain knowledge, hence have limited usability. Updates to these detection models will also require domain knowledge and therefore can be difficult and costly. Furthermore, it will be difficult for human experts to extract activities from training data when the system is large or complex

SUMMARY OF THE INVENTION

One aspect of the present invention is to provide a detective method and detective system for activity-or-behavior model construction and automatic detection of the abnormal activities or behaviors of a subject system without requiring prior domain knowledge. According to one embodiment of the invention, a detective method may be applied in a detective system which comprises an activity-or-behavior model constructor (for activity-or-behavior model construction) and a detection module (for detecting abnormal activities or behaviors of a subject system). The detective method comprises steps of: using an unsupervised machine learning technique to preprocess and analyze raw sensor data obtained from the monitored subject system to generate post data; with the post data as input, using a Natural Language Processing technique (NLP) to discover the activities or behaviors performed by the subject system; and with output data from the NLP technique as input, using a supervised machine learning technique to build an activity-or-behavior model for predicting the behaviors of the subject system. The detection module may automatically detect abnormal activities or behaviors of the subject system; wherein the activity-or-behavior model is capable to handle multidimensional sensor data inputs from a plurality of sensor data streams and incorporates the sensor data values and a selected temporal information about at least one sensor data stream and between different sensor data streams.

In one aspect of the invention, an embodiment of the invention is provided that a detective system comprising a activity-or-behavior model constructor configured to execute at least the steps of the method as mentioned above.

The detective method and detective system described here is the new solution to construct at least one activity-or-behavior model and detect the subject system's abnormal activities or behaviors in an environment consisting of sensors of multiple types without relying on any prior domain knowledge about the device.

BRIEF DESCRIPTION OF THE DRAWINGS

Various objects and advantages of the present invention will be more readily understood from the following detailed description when read in conjunction with the appended drawing, in which.

DESCRIPTION OF EMBODIMENTS OF THE INVENTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "embodiment," "example embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
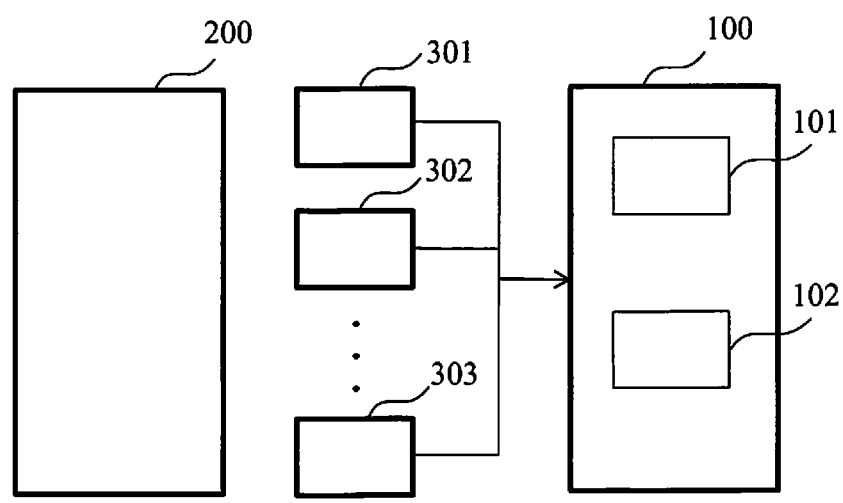
FIG. 1 shows an exemplary detective system according to the present invention.
Figure 2:
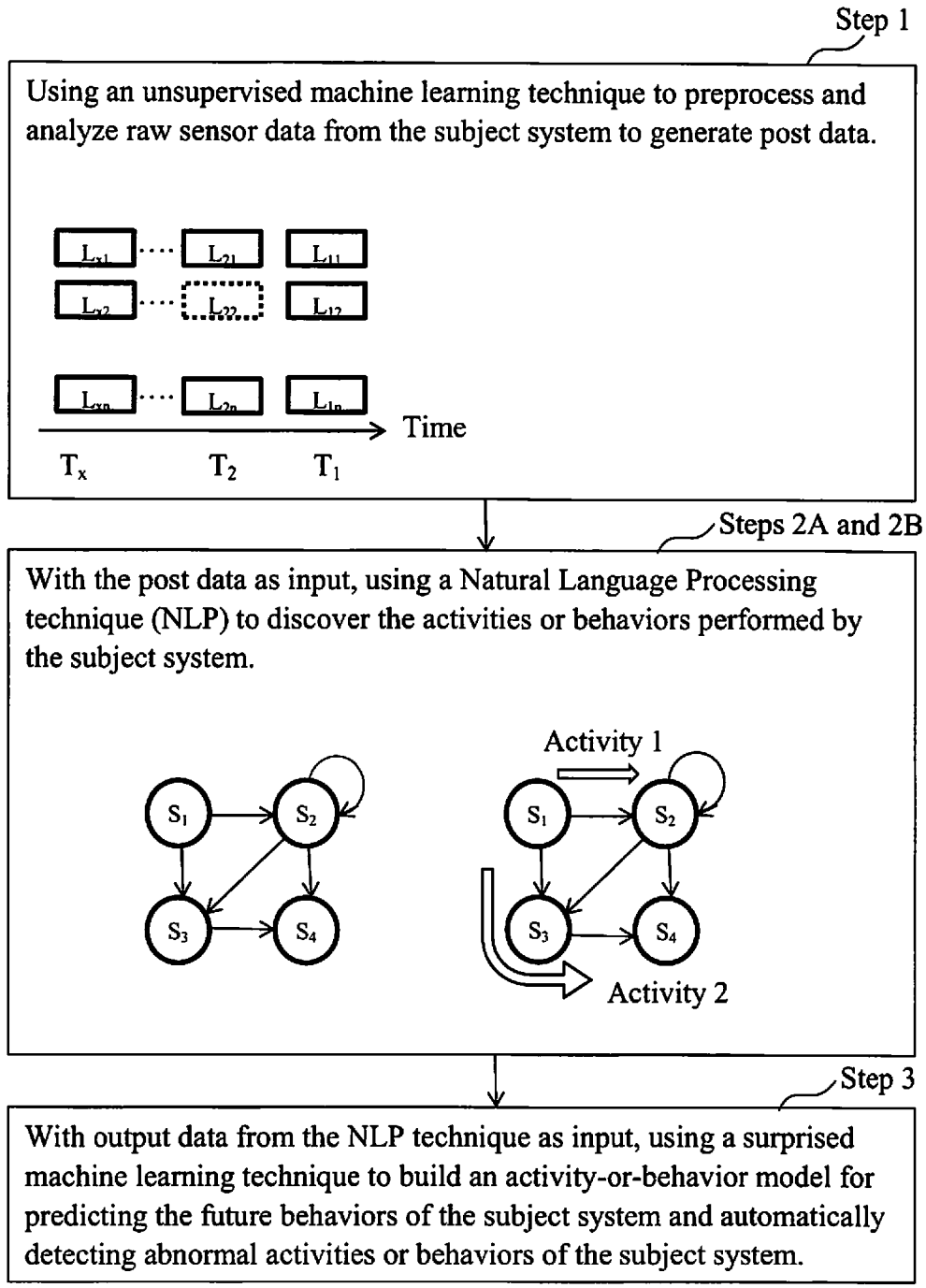
FIG. 2 illustrates an exemplary flow chart of a detective method as shown in FIG. 2 according to the present invention.
Figure 3:
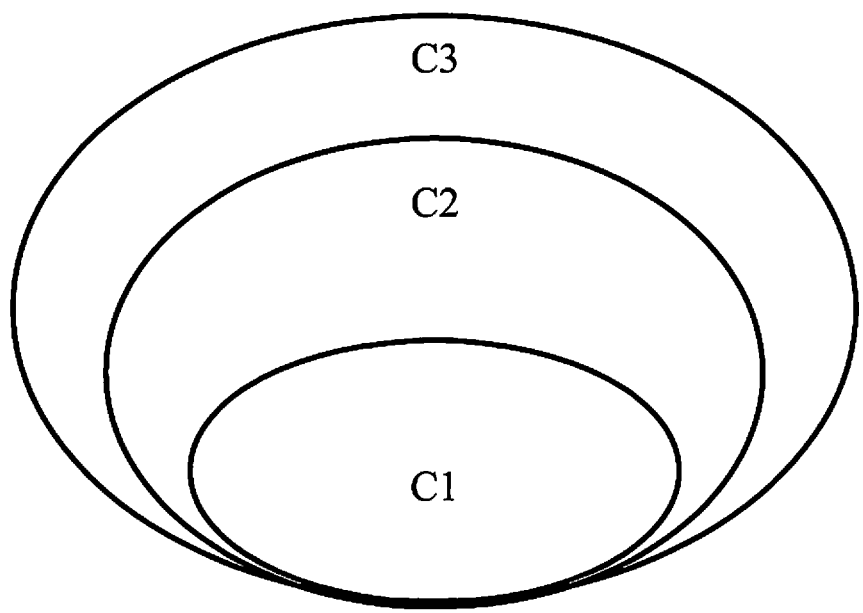
FIG. 3 illustrates the problem domains addressed by these five categories of detection methods.

In the present specification, several examples of a detective method and system for automatic detection of the abnormal activities or behaviors of a system without requiring prior domain knowledge are disclosed. Please refer to FIGS. 1 and 2, in which FIG. 1 shows an exemplary detective system applying a method as shown in FIG. 2 according to the present invention. The detective system 100 comprising an activity-or-behavior model constructor 101 receives multidimensional sensor data input from several types of sensors 301, 302, 303 monitoring the subject system 200 through a plurality of sensor data streams and a detection module 102. The subject system 200 may be any system such as a vehicle, a manufacturing machine, a train, a network, a network node, a smart home, an oil and gas pipeline system, and more.

In the present embodiment, according to the method applied in the detective system 100 for detection of abnormal activities or behaviors of the subject system 200, the detective system 100 first preprocesses and analyzes raw sensor data from the subject system 200 to generate post data. Examples of post data may be but not limited to label values, entries in a label report, the label report, a state, which may be detailed later. Based on the post data, the detective system 100 then may use Natural Language Processing (NLP) techniques to discover abnormal activities or behaviors performed by the subject system 200 and may use machine learning to construct at least one activity-or-behavior model for predicting at least one future activity of the subject system 200 and detecting at least one abnormal activity or behavior of the subject system 200. The activity-or-behavior model, which may be detailed later, is capable to handle multidimensional sensor data input from a plurality of sensor data streams and incorporate not only the sensor data values of the multidimensional sensor data input but also a selected temporal information about each sensor data stream and between different sensor data streams. The selected temporal information may be but not limited to attribute of state, which may be detailed later.

In an embodiment, the detective method may comprise two parts: one is for activity-or-behavior model construction and the other is for anomaly, abnormal activities or behavior detection. An exemplary flow for the activity-or-behavior model construction part consists of three steps. Step 1 is using an unsupervised machine learning technique to preprocess and analyze raw sensor data from the sensors 301-303 monitoring the subject system 200 to generate post data, such as label reports, a merged label report, etc. For example, in step 1, raw sensor data are transformed into a time series of label values. Specifically, the activity-or-behavior model constructor 101 in the detecting system 100 receives from each sensor 301-303 in the subject system 200 a series of raw sensor data, which may be for example but not limited to in the format of <sensor data value, time slot, day, sensor ID>. The activity-or-behavior model constructor 101 may be applied an unsupervised machine learning technique (e.g., the K-Nearest Neighbor algorithm and the K-mean algorithm) to classify the raw sensor data values from each sensor and transform the time series of raw sensor data into a time series of label values, which may be in the form of, e.g., <label value of sensor data value, time slot. day, sensor ID>. For example, the time series of raw sensor data, 0.11, 0.13, 0.99, 0.09, 0.98, 0.11, from all On-Off pressure sensors may be landed as $L_{i1}$, $L_{i1}$, $L_{i2}$, $L_{i1}$, $L_{i2}$, $L_{i1}$, the label value for the raw data point.

The activity-or-behavior model constructor 101 then may generate label reports that indicate the label values for each sensor 301-303 at each time slot. The activity-or-behavior model constructor 101 may merge the label reports from all sensors 301-303 into a single file, referred to as the merged label report, and sort entries of the merged label report according to time. The merged label report may contain a multidimensional time series, which will be used as input to step 2 comprising step 2A and step 2B, detailed later, to discover the activities or behaviors performed by the subject system 200 with the post data as input, using a Natural Language Processing technique (NLP).

In the following steps, the detective method and system may treat the content of the merged label report as the text of a natural language. The unique entries and their attributes in the text will be treated as letters in the natural language. In another embodiment, selected groups of entries and their attributes may be used as letters in the natural language.

These letters then may map into the states of the activity-or-behavior model of the subject system 200. The method and system then may model an activity or behavior of the subject system 200 as a sequence of states in the activity-or-behavior model or a word consisting a sequence of some letters in natural language.

In the step 2A, the merged label report may be transformed into a D file used to identify states for the activity-or-behavior model, and then each entry in the D file is scanned and marked with its corresponding state to generate a $D^+$ file. At first, states, i.e. letters, may be extracted from the merged label report for the activity-or-behavior model and a state transition graph may be generated with NLP techniques to identify the relationship among the states. For example, the sensor label values and the selected attributes (e.g., timing information) for each entry in the merged label report may form a state in the activity-or-behavior model, and then a state may be in the form of <label value value of Sensor 301, label value value of Sensor 302, . . . , label value value of Sensor i, . . . , >. The activity-or-behavior model constructor 101 may add the selected time attributes to every entry in the merged label report to generate a D file that will be used to identify the states for the activity-or-behavior model.

The activity-or-behavior model constructor 101 then may scan each entry of the D file, mark each entry in the D file with its corresponding state to generate a $D^+$ file. The activity-or-behavior model constructor 101 may further identify the relationship among the states (e.g., the state transition graph) with the $D^+$ file.

Examples of the D file and the $D^+$ file may be found in the sample data reprocessing approaches that we will describe as Approaches 1, 2. 3, 4, and 5 later in this specification.

For different types of the subject systems, the method and system may apply different data preprocessing approaches to add, remove, or modify the attributes of the states used to build the activity-or-behavior model to tune the performance of detection. In the following, five different sample data preprocessing approaches are illustrated. Approaches 1, 2, and 3 could be applied for smart home applications [e.g., datasets A1, A2, A3, A4], approach 4 could be applied for connected and autonomous vehicles [e.g., datasets A5], and Approach 5 could be applied for gas pipelines with SCADA monitoring systems [e.g., datasets A6].

Approach 1: In this approach, the label values of all sensors 301-302 at the same time slot may form a state in the activity-or-behavior model of the subject IoT system. That is, state $c_i$ for time slot I may take the form of <label value value of Sensor 301, label value of Sensor 302, . . . , label value value of Sensor i, . . . >. The states at different time slots may be identical. The activity-or-behavior model constructor 101 transforms the merged label report into the D file, and each entry of which is in the format of <time slot, day, label value of Sensor 301, label value of Sensor 302, . . . , label value of sensor i, . . . >. The activity-or-behavior model constructor 101 may mark each entry in the D file with its corresponding state to generate the $D^+$ file with the format <time slot, day, state>.

In this implementation example, the activity-or-behavior model constructor 101 may adopt the n-Gram Model, such as 2-Gram Model in natural language processing to scan the $D^+$ file to find all activities or behaviors the subject device may have, and generate the $D^*$ file with the format <time slot when the activity or behavior starts, day, activity or behavior>.

The activity-or-behavior model constructor 101 may build the activity-or-behavior model using a supervised machine learning technique, where the time attribute <time slot, day> of an entry in the $D^*$ file is the attribute input to the supervised machine learning algorithm where day indicates the day in a week, and the corresponding <activity or behavior> of the entry is the label input to the supervised machine learning algorithm.

Given <time slot, day> as the attribute input to the activity-or-behavior model, then the anomaly detection part in the core approach may be applied to determine whether the machine is normal or abnormal.

Approach 2: Consider on-off sensors only, for each entry in the merged label report, the activity-or-behavior model constructor 101 may calculate the time duration for a sensor 301-303 that remains in the high label value, i.e., <$t_{off \to on}$, $t_{on \to off} - t_{off \to on}$, day, sensor ID>, sort these entries in the merged label report, and obtain the D file.

In this approach, a state $c_i$ may be defined as <labeled time duration, the sensor ID>. For each entry belonging to the same sensor 301-303 in the D file, the activity-or-behavior model constructor 101 may use an unsupervised machine learning algorithm to cluster and label the time durations and mark the corresponding state for each entry in the D file, and generate the $D^+$ file with the format <$t_{off \to on}$, labeled time duration for the sensor, day, sensor ID, state>.

Similar to Approach 1, the activity-or-behavior model constructor 101 may use the 2-Gram Model to scan the $D^+$ file to find all activities or behaviors the subject device may have, and generate the $D^*$ file with the format <time slot when the activity or behavior starts, label value's time duration for the activity or behavior, day, activity or behavior>.

The activity-or-behavior model constructor 101 may build the activity-or-behavior model by using a supervised machine learning technique, where <time slot when the activity starts, labeled time duration for the activity or behavior, day> of an entry in the $D^*$ file is the attribute input to the supervised machine learning algorithm, and the corresponding <activity or behavior> of the entry is the label input to the supervised machine learning algorithm.

Given <time slot when the activity or behavior starts, labeled time duration, day> as the attribute to the activity-or-behavior model, the activity-or-behavior model constructor 101 may determine the subject device is normal or abnormal by applying the anomaly detection part in the core approach.

Approach 3: The same as Approach 2, the activity-or-behavior model constructor 101 may generate the D file, and then the $D^+$ file, where the D file and the $D^+$ file are in the same format as that in Approach 2. The state $c_1$ defined in this approach may be the same as that in Approach 2 and $c_1$ may be <labeled time duration for the sensor, the sensor ID>.

Similar to Approach 1, the activity-or-behavior model constructor 101 may use the 2-Gram Model to scan the $D^+$ file to find all activities or behaviors the subject device may have, and generate the $D^*$ file with the format <the time slot when the activity or behavior starts, day, labeled time duration for the activity or behavior, the time duration ratios of sensors, activity or behavior>. The time duration ratios of sensors 301-303 may be obtained by the labeled time durations (when the sensors 301-303 remain in the high label values during an activity or behavior) divided by the time duration of the activity.

The activity-or-behavior model constructor 101 may build the activity-or-behavior model using a supervised machine learning technique, where <the time slot when the activity or behavior starts, day, label value's time duration for the activity or behavior, the time duration ratios of sensors> of an entry in the D* file may be the attribute input to the supervised machine learning algorithm, and the corresponding <activity or behavior > of the entry may be the label input to the supervised machine learning algorithm. %

Given <the time slot when the activity or behavior starts, day, label value's time duration for the activity or behavior, the time duration ratios of sensors> input as the attribute to the activity-or-behavior model, the activity-or-behavior model constructor 101 may determine the subject device is normal or abnormal by applying the anomaly detection part in the core approach.

Approach 4: The same as Approach 1, the activity-or-behavior model constructor 101 may merge the label reports into a merged label report, generate the D file, and then the $D^+$ file in the same format as in Approach 1.

Similar to Approach 1, the activity-or-behavior model constructor 101 may use the 2-Gram Model to scan the $D^+$ file to find all activities or behaviors the subject device may have performed, and generate the D* file with the format <the time slot when the activity or behavior starts, day, the expected sensor value for each sensor during the time period when the activity or behavior occurs, activity or behavior>.

The activity-or-behavior model constructor 101 may build the activity-or-behavior model using a supervised machine learning technique, where <the time slot when the activity or behavior starts, day, the expected sensor value for each sensor during the time period when the activity or behavior occurs> of all entry in tile D* file may be the attribute input to the supervised machine learning algorithm, and the corresponding <activity or behavior > of the entry may be the label input to the supervised machine learning algorithm.

Approach 5: The sensor data obtained from sensors 301-303 may be incomplete. For example, in the dataset in [A6], sensor values from a large number of time slots may be missing for each sensor 301-303. Approach 5 is proposed to address the issue. In Approach 5, the missing sensor values in the merged label report may be filled by the processes as follows.

Suppose that the sensor value (denoted by $v_{i,j}$) of sensor i at time slot j is missing, then $v_{i,j}$ may be set to the value (i.e., $v_{i,j}=f(i,j)$) by the following recursive function:

Function $f(i,j)$
if j=0: return null;
else if $v_{i,j-1}$ is missed: return $f(i,j-1)$;
else: return $v_{i,j-1}$.

By doing, the missed sensor value at time slot j may imply the sensor value remain the same as the sensor value at time slot j−1, i.e., no change of the sensor value.

After the above recursive function is executed, if $v_{i,j}$ is null, then the entry for $v_{i,j}$ is deleted from the merged label report.

The activity-or-behavior model constructor 101 may generate the D file, the $D^+$ file, and the D* file in the same way as Approach 4.

The activity-or-behavior model constructor 101 may build the activity-or-behavior model using a supervised machine learning technique, where <the time slot when the activity or behavior starts, day, the expected sensor value for each sensor during the time period when the activity or behavior occurs> of an entry in the D* file may be the attribute input to the supervised machine learning algorithm, and the corresponding <activity or behavior > of the entry may be the label input to the supervised machine learning algorithm. %

Then, in the step 2B, at least one activity or behavior, i.e. word, may be identified and/or discovered with NLP techniques. By scanning the $D^+$ file, the activity-or-behavior model constructor 101 may identify and/or discover at least one activity or behavior of the subject system 200 using a word-segmentation technique used in NLP. Examples of such word-segmentation techniques include the n-Gram Model, the Hidden Markov Model, etc. After identifying the activities, the activity-or-behavior model constructor 101 may mark the entries in the $D^+$ file with their corresponding activities or behaviors to transform the $D^+$ file into a D* file where each entry will be marked with the activity-or-behavior model state that the entry is associated with, the attributes of the state, and/or the activities or behaviors the state is associated with.

For example, here a 2-Gram Model is taken to show how the word segmentation techniques used in the NLP may be used in Step 2B to discover the activities or behaviors performed by the subject system 200 from the sensor data inputs. The 2-Gram Model may exercise as follows: For each pair of states $c_i$ and $c_j$, the activity-or-behavior model constructor 101 may calculate the probability $P(c_j|c_i)$ of state transition from $c_i$ to $c_j$. Scanning the $D^+$ file, $P(c_j|c_i)$ may be computed as the number of times the state has transitioned from $c_i$ to $c_j$ divided by the number of occurrences of state $c_i$. Then, the activity-or-behavior model constructor 101 may use $P(c_j|c_i)$ to construct a Markov process over the set of states, which will be the state transition diagraph. With the Markov process, the activity-or-behavior model constructor 101 may use the 2-Gram Model to compute the probability that any activity or behavior will occur. Considering a state sequence, $c_1$, $c_2$, $c_3$, $c_r$, $c_{r+1}$. An activity or behavior $Wi="c_1c_2c_3 \ldots c_r"$ occurs with one of the following options.

Option 1: if $P(c_2|c_i)P(c_3|c_2) \ldots P(c_r|c_{r-1}) \geq \theta_a$ and $P(c_2|c_1) P(c_3|c_2) \ldots P(c_r|c_{r-1}) P(c_{r+1}\kappa_r) < \theta_a$, where the predefined threshold $\theta_a$ is used to cut a word, and $0 < \theta_a \leq 1$.

Option 2: if $P(c_1)P(c_2|c_1)P(c_3|c_2) \ldots P(c_r|c_{r-1}) \geq \theta_a$ and $P(c_1)P(c_2|c_1)P(c_3|c_2) \ldots P(c_r|c_{r-1}) P(c_{r+1}|c_r) < \theta_a$, where the predefined threshold $\theta_a$ is used to cut a word, and $0 < \theta_a \leq 1$.

Option 1 considers the occurrence probability of a sequence of letters. Option 2 also considers the occurrence of the first letter $c_1$ (i.e., $P(c_1)$) in a letter sequence. In other words, if $P(c_1)$ is too small, the activity or behavior $W_i$ may not be put into consideration.

If we tune the value of $\theta_a$ larger than 1, the conditions in Option 1 or Option 2 may never be true, and consequently all activities or behaviors may always contain a single state. With this setup for $\theta_a$, the detecting method may cover the case of detecting only data anomaly.

Then, in step 3, with output data from the NLP technique as input, using a supervised machine learning technique to construct an activity-or-behavior model for predicting at least one future activity or behavior of the subject system and automatically detecting at least one abnormal activity or behavior of the subject system is performed. An activity-or-behavior model may be constructed. With the D* file as input, the activity-or-behavior model constructor 101 may use a supervised machine learning algorithm to build the activity-or-behavior model for the subject system 200. Examples of supervised machine learning algorithms for this purpose include the Random Forests, the Support Vector Machine, and etc. The attributes (e.g., sensor label values and/or their temporal attributes) of the states of an activity or behavior in the activity-or-behavior model may be the attributes input to the supervised machine learning algorithm and their associated activities or behaviors may be the labels input to the supervised machine learning algorithm.

Here, the detection part is detailed. Using the activity-or-behavior model, given the attributes (e.g., the time attributes, and labeled sensor values) of the states of an activity or behavior as the attribute input to a supervised machine learning algorithm, the detecting module 102 may use the supervised machine learning algorithm and output a predicted activity or behavior set, denoted by A, (i.e., the output labels of the supervised machine leaning algorithm). For example, $A=\{a_1, a_2, \ldots, a_n\}$. For each activity or behavior $a_i$ in A, the supervised machine learning algorithm may also output a corresponding occurrence probability $p(a_1)$. The detective system 100 may determine the subject system 200 is abnormal when at least one of the conditions is satisfied: that (1) the actual activity or behavior a* does not fall into A, and (2) the actual activity or behavior a* falls into A and $p(a^*)<\Delta$ where $0<\Delta<1$ is a predefined threshold. Properly tuning $\Delta$ may improve the performance of the IoT detective.

The detective method and system described here is the new solution to detect a system's or a device's abnormal activities or behaviors in an environment consisting of sensors of multiple types without relying on any prior domain knowledge about the device. The detective method and system include new ways to combine the machine leaning techniques and the natural language processing techniques to transform sensor data series and their associated timing information into activity-or-behavior models for the subject system 200 by identifying states and constructing state transition diagrams. The detective method and system further include new ways to use the activity-or-behavior model to identify activities or behaviors of the subject system 200, and predict whether a new activity or behavior is abnormal. The detective method and system can handle multiple data streams form the same or different types of sensors.

The detective method and system can detect abnormal activities or behaviors of a subject system 200 without relying on any prior domain knowledge about the subject system 200. Rather than relying on domain knowledge to know the activities or behaviors performed by the subject system 200, the detective method and system can automatically discover the activities or behaviors performed by the subject system 200 from the sensor data received from the subject system 200, by a novel application of natural language processing techniques. Once activities or behaviors are discovered, the method and system may use machine learning to construct an activity-or-behavior model that can be used to detect future abnormal activities or behaviors.

The detective method and system may treat the subject device as a black box and detect abnormal activities or behaviors in any type of subject system 200. The detective method and system may be implemented and operated without changing the subject system, and hence can work for old and new systems. Prior arts typically cannot handle high-dimensional sensor input data and temporal relationships between the data samples at the same time. The detective method and system disclosed here is capable to take input from many sensors of different types and also take into account the timing information and therefore be able to detect time-based anomalies that prior arts cannot.

The detective method and system disclosed here fill a critical technology gap for securing the Internet of Things, which is the ability to detect abnormal activities or behaviors of a system without requiring rich prior domain knowledge about the system. Most prior arts rely on detailed prior domain knowledge about the subject system in order to define activities or behaviors performed by the system, identify these activities or behaviors from training data when using machine learning to build detection models, and therefore are difficult to be applied to different types of devices and applications, or in multiple industry sectors. The detective method and system disclosed here do not rely on any prior domain knowledge and therefore can be used in different industry verticals and application domains. The detective method and system also overcome crucial limitations of the existing anomaly detection methods that are also trying to perform anomaly detection without prior domain knowledge. For example, unlike prior arts that can only handle a single type of sensors, the detective method and system can integrate input from multiple sensors of the same or different types. While the prior arts consider only the values of sensor data, the method and system will also take into account selected timing information regarding each sensor data stream and between different sensor data streams.

It is to be understood that these embodiments are not meant as limitations of the invention but merely exemplary descriptions of the invention with regard to certain specific embodiments. Indeed, different adaptations may be apparent to those skilled in the art without departing from the scope of the annexed claims. For instance, it is possible to add bus buffers on a specific data bus if it is necessary. Moreover, it is still possible to have a plurality of bus buffers cascaded in series.

What is claimed is:

1. A detective method, applied in a detective system comprising an activity-or-behavior model constructor, for activity-or-behavior model construction and automatic detection of abnormal activities or behaviors of a subject system, comprising steps of:

using an unsupervised machine learning technique to preprocess and analyze raw sensor data obtained from the monitored subject system to generate post data, comprises steps of:

transforming the raw sensor data into a time series of label values;

generating label value reports that indicate the label values for each sensor at each time slot;

merging the label value reports into a merged label value report; and sorting entries of the merged label value report according to time;

with the post data as input, using a Natural Language Processing technique (NLP) to discover activities or behaviors performed by the subject system, comprises steps of:

extracting the states for the activity-or-behavior model with the label values and selected attributes for each entry in the merged label value report;

adding the selected attributes to every entry in the merged label value report to generate a D file to identify states for the activity model, wherein each entry of the D file is the states for the activity-or-behavior model; and marking each entry in the D file with its corresponding state to generate a $D^+$ file;

with output data from the NLP technique as input, using a supervised machine learning technique to construct an activity-or-behavior model for predicting the future behaviors of the subject system and automatically detecting the abnormal activities or behaviors of the subject system;

wherein the activity-or-behavior model handles multidimensional sensor data input from a plurality of sensor data streams and incorporates the sensor data values and a selected temporal information about at least one sensor data stream and between different sensor data streams.

2. The detective method according to claim 1, wherein the unsupervised machine learning technique comprises one of K-Nearest Neighbor algorithm, K-mean algorithm, and GMM (Gaussian Mixture Model) algorithm.

3. The detective method according to claim 1, wherein the Natural Language Processing technique comprises a word-segmentation technique comprising one of a Hidden Markov Model, n-Gram Model and 2-Gram Model.

4. The detective method according to claim 3, further comprising a step of:
scanning the $D^+$ file to find all activities or behaviors the subject device may have and generate the $D^*$ file with the format <time slot when the activity or behavior starts, day, activity or behavior>;
wherein the state for time slot I takes the form of <label value of Sensor 1, label value of Sensor 2, ..., label value of Sensor i, ...>,
each entry of the D file is in the format of <time slot, day, label value of Sensor 1, label value of Sensor 2, ..., label value of sensor i, ...>,
$D^+$ file takes the form of <time slot, day, state>, and
an attribute input file takes the form of <time slot, day>.

5. The detective method according to claim 3, further comprising a step of:
calculating a time duration for a sensor that remains in the high label value in the form of <$t_{off \to on}$, $t_{on \to off}$-$t_{off \to on}$, day, sensor ID>;
sorting the entries in the merged label report to obtain the D file; and
scanning a $D^+$ file to find all activities or behaviors the subject device may have and generate the $D^*$ file with the format <time slot when the activity or behavior starts, label value's time duration for the activity or behavior, day, activity or behavior>;
wherein the state takes the form of <label valued time duration, the sensor ID>,
$D^+$ file takes the form of <$t_{off \to on}$, label valued time duration for the sensor, day, sensor ID, state>,
an attribute input file takes the form of <time slot when the activity starts, label valued time duration for the activity or behavior, day>, and
<activity or behavior> of the entry is the label value input to the supervised machine learning algorithm.

6. The detective method according to claim 3, further comprising a step of:
scanning the $D^+$ file to find all activities or behaviors the subject device may have and generate a $D^*$ file with the format <the time slot when the activity or behavior starts, day, label valued time duration for the activity or behavior, the time duration ratios of sensors, activity or behavior>;
wherein the state takes the form of <label valued time duration, the sensor ID>,
$D^+$ file takes the form of <$t_{off \to on}$, label valued time duration for the sensor, day, sensor ID, state>,
an attribute input to the supervised machine learning algorithm takes the form of <the time slot when the activity or behavior starts, day, label value's time duration for the activity or behavior, the time duration ratios of sensors> of an entry in the $D^*$ file,
the corresponding <activity or behavior> of the entry may be the label value input to the supervised machine learning algorithm.

7. The detective method according to claim 3, further comprising a step of:
generate a $D^*$ file with the format <the time slot when the activity or behavior starts, day, the expected sensor value for each sensor during the time period when the activity or behavior occurs, activity or behavior >;
wherein each entry of the D file is in the format of <time slot, day, label value of Sensor 1, label value of Sensor 2, ..., label value of sensor i, ...>,
$D^+$ file takes the form of <time slot, day, state>, and
an attribute input to the supervised machine learning algorithm takes the form of <the time slot when the activity or behavior starts, day, the expected sensor value for each sensor during the time period when the activity or behavior occurs> of an entry in the $D^*$ file, the corresponding <activity or behavior > of the entry may be the label value input to the supervised machine learning algorithm.

8. The detective method according to claim 3, further comprising a step of:
giving the attributes of the states of an activity or behavior as an attribute input to output a predicted activity or behavior set A by the supervised machine learning algorithm;
wherein A={$a_1$, $a_2$, ..., $a_n$}, and for each activity or behavior $a_i$ in A, a corresponding occurrence probability $p(a_1)$ is outputted by the supervised machine learning algorithm.

9. The detective method according to claim 1, wherein the step of with the post data as input, using a Natural Language Processing technique to discover activities or behaviors performed by the subject system further comprises steps of:
identifying and/or discovering at least one activity or behavior of the subject system by scanning the $D^+$ file; and
marking entries in the $D^+$ file with their corresponding activities or behaviors to transform the $D^+$ file into a $D^*$ file where each entry will be marked with the state that the entry is associated with, the attributes of the state, and/or the activities or behaviors the state is associated with.

10. The detective method according to claim 1, wherein the supervised machine learning technique comprises one of Random Forests, and Support Vector Machine.

11. The detective method according to claim 1, further comprising a step of:
with the activity-or-behavior model, by a detection module of a detecting system, to predict at least one future activity of the subject system and detect at least one abnormal activity or behavior of the subject system.

12. The detective method according to claim 1, further comprising a step of:
determining the subject system is abnormal when at least one of conditions as follows is satisfied: that (a) an actual activity or behavior a* does not fall into A, and (b) the actual activity or behavior a* falls into A and p(a*)<Δ where 0<Δ<1 is a predefined threshold, wherein A={$a_1$, $a_2$, ..., $a_n$}, and for each activity or behavior $a_i$ in A, p(a*) is a corresponding occurrence probability of the actual activity or behavior outputted by the supervised machine learning algorithm.

* * * * *